(12) United States Patent
Berg et al.

(10) Patent No.: US 10,926,717 B2
(45) Date of Patent: Feb. 23, 2021

(54) VEHICLE WITH INTEGRATED PORTABLE WIRELESS SPEAKER SYSTEM

(71) Applicants: Matthew A Berg, Waterford, MI (US); Coby S Clark, Troy, MI (US)

(72) Inventors: Matthew A Berg, Waterford, MI (US); Coby S Clark, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/660,959

(22) Filed: Oct. 23, 2019

(65) Prior Publication Data

US 2020/0130603 A1 Apr. 30, 2020

Related U.S. Application Data

(60) Provisional application No. 62/749,880, filed on Oct. 24, 2018.

(51) Int. Cl.
| | |
|---|---|
| *H04B 1/00* | (2006.01) |
| *H04R 5/02* | (2006.01) |
| *B60R 11/04* | (2006.01) |
| *B60J 1/04* | (2006.01) |
| *G01S 13/86* | (2006.01) |
| *H04N 5/225* | (2006.01) |
| *B60R 7/04* | (2006.01) |

(Continued)

(52) U.S. Cl.
CPC ................ *B60R 11/04* (2013.01); *B60J 1/04* (2013.01); *B60N 2/305* (2013.01); *B60N 2/3011* (2013.01); *B60R 7/043* (2013.01); *B60R 11/0217* (2013.01); *E05B 83/28* (2013.01); *E05C 9/047* (2013.01); *G01S 13/867* (2013.01); *H04N 5/2252* (2013.01); *H04N 5/2253* (2013.01); *H04R 5/02* (2013.01); *B60N 2/02* (2013.01); *B60N 2/919* (2018.02); *B60Q 3/30* (2017.02); *B60R 2011/0024* (2013.01); *B60R 2011/0026* (2013.01); *E05Y 2900/538* (2013.01); *G01S 2013/93276* (2020.01); *H04R 2420/07* (2013.01); *H04R 2499/13* (2013.01)

(58) Field of Classification Search
CPC ..... B60R 11/04; B60R 7/043; B60R 11/0217; B60R 2011/0024; B60R 2011/0026; B60J 1/04; B60N 2/3011; B60N 2/305; B60N 2/919; B60N 2/02; E05B 83/28; E05C 9/047; G01S 13/867; G01S 2013/93276; H04N 5/2252; H04N 5/2253; H04R 5/02; H04R 2420/07; H04R 2499/13; B60Q 3/30; E05Y 2900/538
USPC .......................................................... 381/86
See application file for complete search history.

(56) References Cited

U.S. PATENT DOCUMENTS

| | | |
|---|---|---|
| 6,608,399 B2 | 8/2003 | McConnell et al. |
| 9,002,572 B2 | 4/2015 | Lipscomb et al. |

(Continued)

*Primary Examiner* — Ammar T Hamid
(74) *Attorney, Agent, or Firm* — Ralph E. Smith

(57) ABSTRACT

A vehicle with an integrated portable audio system includes an interior body defining an interior passenger compartment and a docking station having a back wall, an upper wall, a lower wall, and side walls that define a receiving compartment. A wireless speaker is removably dockable with the docking station. When docked with the docking station, the wireless speaker is configured to connect to an audio system of the vehicle. When removed from the docking station, the wireless speaker is portable and configured to connect to a peripheral device for playing audio media on the wireless speaker.

9 Claims, 12 Drawing Sheets

(51) Int. Cl.

| | |
|---|---|
| *E05B 83/28* | (2014.01) |
| *E05C 9/04* | (2006.01) |
| *B60N 2/30* | (2006.01) |
| *B60R 11/02* | (2006.01) |
| *B60R 11/00* | (2006.01) |
| *G01S 13/931* | (2020.01) |
| *B60Q 3/30* | (2017.01) |
| *B60N 2/90* | (2018.01) |
| *B60N 2/02* | (2006.01) |

(56) References Cited

U.S. PATENT DOCUMENTS

| | | |
|---|---|---|
| 9,207,713 B1 | 12/2015 | Waide |
| 2006/0094349 A1 | 5/2006 | Slesak et al. |
| 2006/0163069 A1* | 7/2006 | Prak ............... G01N 27/44704 |
| | | 204/601 |
| 2009/0292851 A1 | 11/2009 | Mead et al. |
| 2009/0327561 A1 | 12/2009 | Groesch |
| 2010/0138581 A1 | 6/2010 | Bird et al. |
| 2012/0033375 A1 | 2/2012 | Madonna et al. |
| 2013/0241720 A1 | 9/2013 | Ricci et al. |
| 2014/0266725 A1* | 9/2014 | Berglund ........... G08B 13/1409 |
| | | 340/568.8 |
| 2017/0105069 A1* | 4/2017 | Mezzomo ............. H04R 1/026 |

* cited by examiner

VEHICLE WITH INTEGRATED PORTABLE WIRELESS SPEAKER SYSTEM

CROSS REFERENCE TO RELATED APPLICATIONS

This application claims the benefit of U.S. Provisional Application No. 62/749,880, filed Oct. 24, 2018, the contents of which are incorporated herein in their entirety by reference thereto.

FIELD

The present application relates generally to vehicle speaker systems and, more particularly, to an integrated portable wireless speaker system for a vehicle.

BACKGROUND

Conventional passenger vehicles typically include permanently affixed speakers hard wired to a vehicle audio system. Such conventional systems are not portable. Wireless speakers are known which connect to user devices such as phones or laptops. However, such wireless speakers are typically not capable of efficiently interfacing with a vehicle and are often unable to recharge when away from an electrical outlet. While such conventional vehicle audio systems well for their intended purpose, there remains a desire for improvement in the relevant art.

SUMMARY

According to one example aspect of the disclosure, a vehicle with an integrated portable audio system is provided. In one example configuration, the vehicle includes an interior body defining an interior passenger compartment and a docking station having a back wall, an upper wall, a lower wall, and side walls that define a receiving compartment. A wireless speaker is removably dockable with the docking station. When docked with the docking station, the wireless speaker is configured to connect to an audio system of the vehicle. When removed from the docking station, the wireless speaker is portable and configured to connect to a peripheral device for playing audio media on the wireless speaker.

In addition to the foregoing, the described vehicle may include one or more of the following features: wherein when docked, the wireless speaker is connected to a power source of the vehicle to automatically charge the wireless speaker; wherein the interior body includes a rear wall, wherein the docking station is integrated into the rear wall; and a floor, a seat including a seat bottom rotatably coupled to a seat back, the seat back selectively latchable to the rear wall and movable between a seating position where the seat back is latched to the rear wall, and a folded seat position where the seat back is rotated downward onto the seat bottom, and a storage compartment defined behind the seat back between the floor, the rear wall, and the seat back, wherein the integrated wireless speaker system is disposed within storage compartment.

In addition to the foregoing, the described vehicle may include one or more of the following features: a seat back locking system integrated into the seat and movable from a locked position that prevents unlatching the seat back from the rear wall, and an unlocked position that enables unlatching of the seat back from the rear wall, wherein in the locked position, the seat back locking system prevents unlatching of the seat back from the rear wall to thereby prevent access to the integrated wireless speaker system; and wherein the docking station includes a dock body, an electrical connector, and a latching system configured to selectively latch to the wireless speaker.

In addition to the foregoing, the described vehicle may include one or more of the following features: wherein the receiving compartment is sized and shaped to removably receive the wireless speaker; wherein the dock body includes a plurality of fasteners configured to couple and secure the dock body to the rear wall; wherein the lower wall includes a locating projection configured to be received by a recess formed in a bottom wall of the wireless speaker to facilitate locating and docking the wireless speaker within the docking station; and wherein the back wall includes a pair of converging projections extending outwardly therefrom, the pair of converging projections configured to receive a locking bar disposed in the wireless speaker and guide the locking bar into interaction with the latching system to secure the wireless speaker to the docking station.

In addition to the foregoing, the described vehicle may include one or more of the following features: wherein the back wall includes a plurality of cavities each having a retention clip disposed therein configured to couple to the vehicle rear wall, and a plurality of covers removably coupled to the back wall to cover the plurality of cavities and conceal the retention clips; wherein the upper wall includes a slot having a release strap extending therethrough, the release strap operably coupled to the latching system to selectively release the wireless speaker from coupling engagement with the docking station; wherein the electrical connector includes electronics and a plurality of pin connectors configured to connect to a second electrical connector of the wireless speaker; and wherein a first portion of the pin connectors provide power and ground to charge the wireless speaker, a second portion of the pin connectors provide additional grounds such that when the speaker is docked, the electronics are shorted out.

In addition to the foregoing, the described vehicle may include one or more of the following features: wherein the latching system includes a support bracket coupled to a rear surface of the dock body, an engagement arm rotatably coupled to the support bracket, and a latch rotatably coupled to the support bracket, the latch configured to selectively latch and engage a portion of the wireless speaker to securely dock the wireless speaker to the docking station; a release strap coupled to the engagement arm, wherein pulling the release strap rotates the engagement arm, thereby causing the latch to rotate and release the portion of the wireless speaker to release the wireless speaker from the docking station; and a biasing mechanism configured to rotatably bias the latch into a locked position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

The present application is directed to an integrated wireless speaker system for a vehicle that includes a wireless speaker and a docking station integrated into a securable storage compartment in the vehicle. The wireless speaker automatically establishes a signal connection to the vehicle and automatically charges when docked in the docking station. The wireless speaker is selectively removable from the docking station and vehicle to provide a portable, wireless audio device.

Additionally, the present application is directed to a seat back locking system for selectively securing a seat back to a rear vehicle wall. A storage compartment is defined between the seat and a rear wall of the vehicle and is configured to house the integrated wireless speaker system. When in an upright, locked position, the seat back prevents access to the storage compartment and the integrated wireless speaker system. Once unlocked, the seat back can be rotated downward into a flat position, thereby providing access to the storage compartment and the integrated wireless speaker system.

Figure 1:
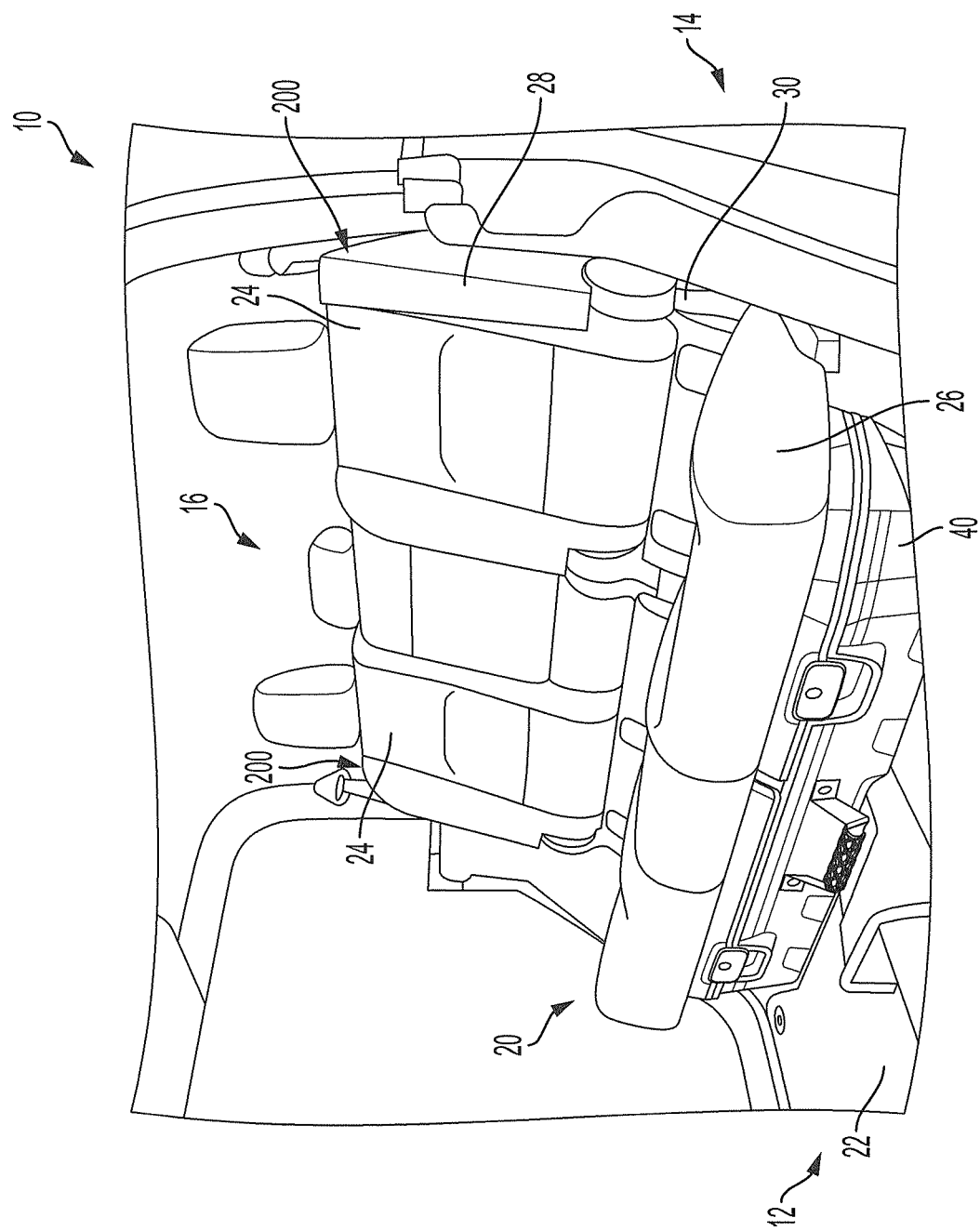
FIG. 1 is a perspective view of an example vehicle having rear seating with a seat back locking system, in accordance with the principles of the present disclosure.

Referring now to the drawings, FIG. 1 illustrates a vehicle 10 generally having a vehicle front 12, a vehicle rear 14, and an interior passenger compartment 16. In the example embodiment, the interior passenger compartment 16 generally includes front seating (not shown), rear seating 20, and a floor 22. The rear seating 20 includes one or more rear seats 24 having a seat bottom 26 rotatably coupled to a seat back 28. As such, the rear seats 24 are configured to rotate into various positions such as a seating position where seat back 28 is secured to a rear wall 30 of the vehicle (FIG. 1), a folded seat position where the seat back 28 is folded forward onto the seat bottom 26 (FIG. 2), and a storage access position where the seat bottom 26 is rotated upward and rearward toward the seat back 28 (not shown). In the example embodiment, rotating the seat back 28 to the folded seat position provides access to an integrated wireless speaker system 40 in a storage compartment 42 located behind seat 24 and at least partially defined by the cab rear wall 30. Additionally, in some embodiments, a seat back locking system 200 is provided to enable secured access to the storage compartment 42.

Figure 3:
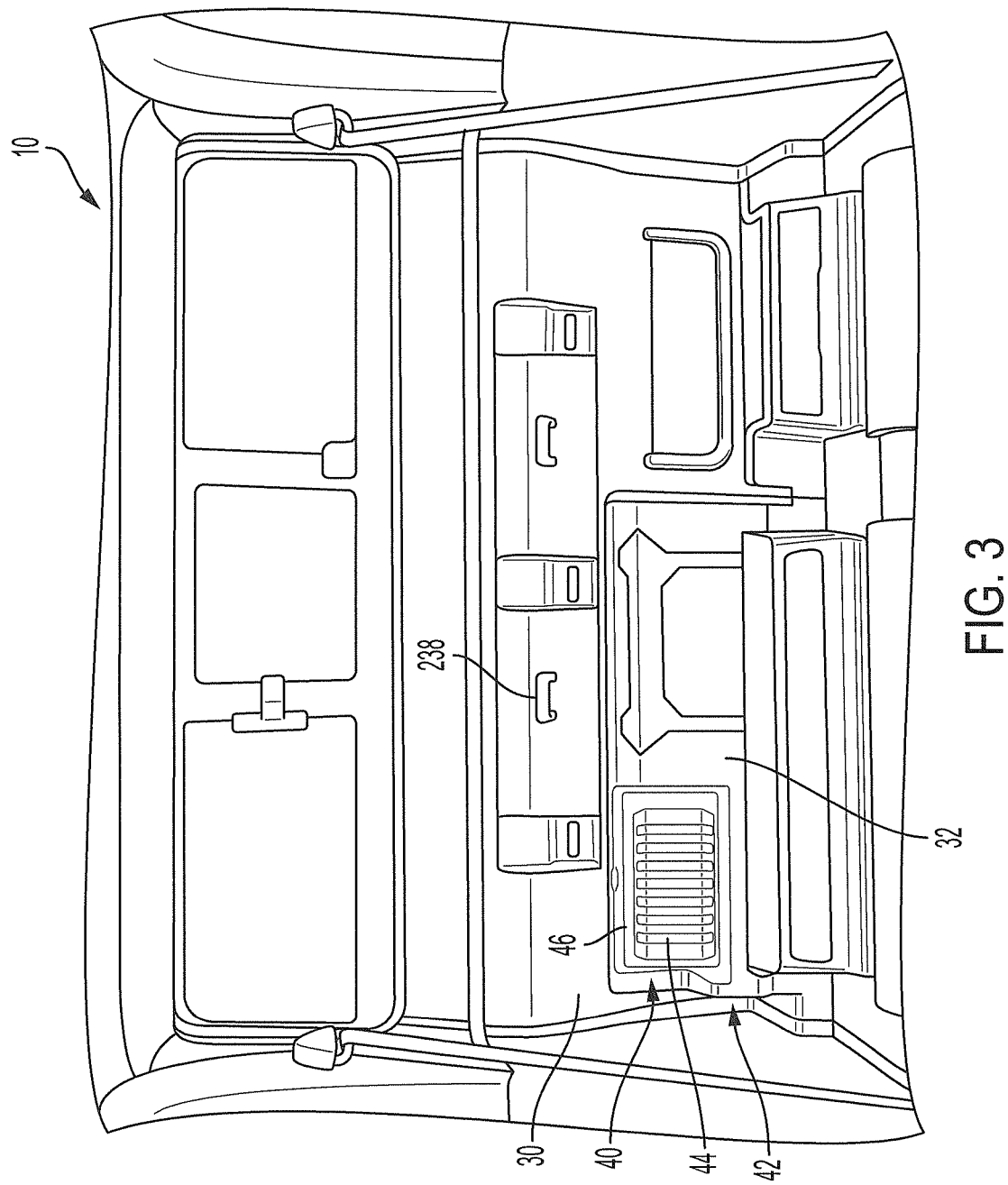
FIG. 3 is a perspective view of the vehicle of FIG. 1 with the rear seating removed to illustrate the example integrated wireless speaker system, in accordance with the principles of the present disclosure.

With reference now FIGS. 3-8, the integrated wireless speaker system 40 will be described in more detail. As shown in FIG. 3, the integrated wireless speaker system 40 generally includes a wireless speaker 44 and a docking station 46. The docking station 46 is integrated into the vehicle interior passenger compartment 16 and is configured to removably receive the wireless speaker 44. In the illustrated example (shown with seats 24 removed), the docking station 46 is integrated into a bracket 32 of the cab rear wall 30 within the secured storage compartment 42. When docked, the wireless speaker 44 integrates with a vehicle audio system and functions as a speaker therefor. Additionally, a battery of the wireless speaker 44 is charged under certain conditions (e.g., when the engine is on). Further still, the wireless speaker 44 advantageously functions as a stand-alone speaker system when removed from the docking station 46 and may be wirelessly connected to other audio devices (e.g., a smart phone) in order to play media thereon.

Figure 5:
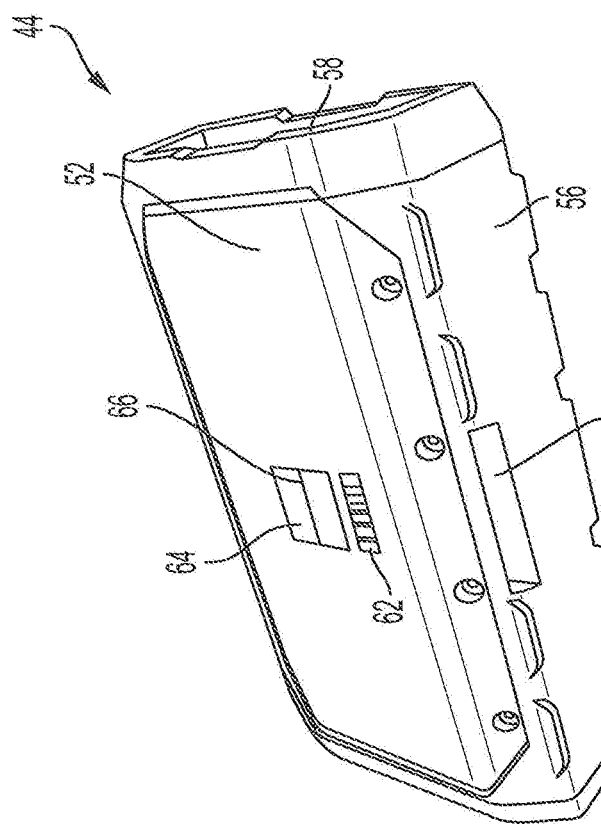
FIG. 5 is a rear perspective view of the wireless speaker shown in FIG. 4, in accordance with the principles of the present disclosure.
Figure 4:
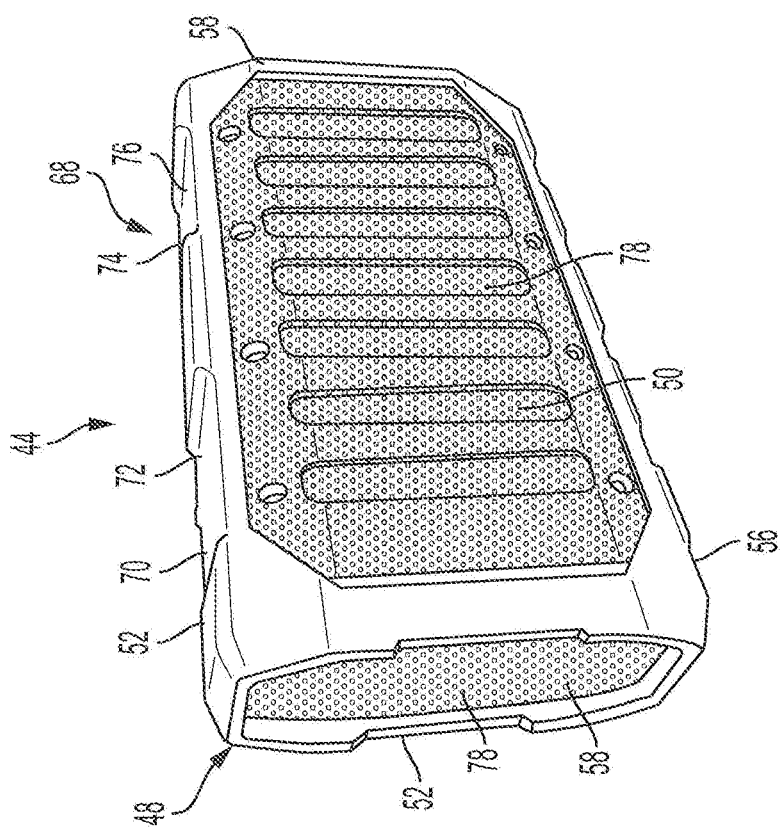
FIG. 4 is a front perspective view of an example wireless speaker of the integrated wireless speaker system shown in FIG. 3, in accordance with the principles of the present disclosure.

With further reference to FIGS. 4 and 5, in the example embodiment, wireless speaker 44 generally includes a housing 48 having a front 50, a back 52, a top 54, a bottom 56, and sides 58. The bottom 56 includes a recess 60, and the back 52 includes an electrical connector 62 and a recess 64 having a locking bar 66 extending thereacross, as described herein in more detail. The top 54 includes control buttons 68 such as, for example, a power button 70, a play/pause button 72, a volume down button 74, and a volume up button 76. It will be appreciated, however, that wireless speaker 44 may have various other control buttons 68 to perform various functions or provide additional features. Further, as shown in FIG. 4, at least a portion of front 50 and sides 58 are fabricated as a speaker grille 78 to protect the internal speaker(s) (not shown) while allowing sound to pass therethrough. Moreover, in the example embodiment, the wireless speaker 44 is fabricated from tough and durable materials such that the wireless speaker is weatherproof, water resistant, and provides a high level of dust protection.

Figure 6:
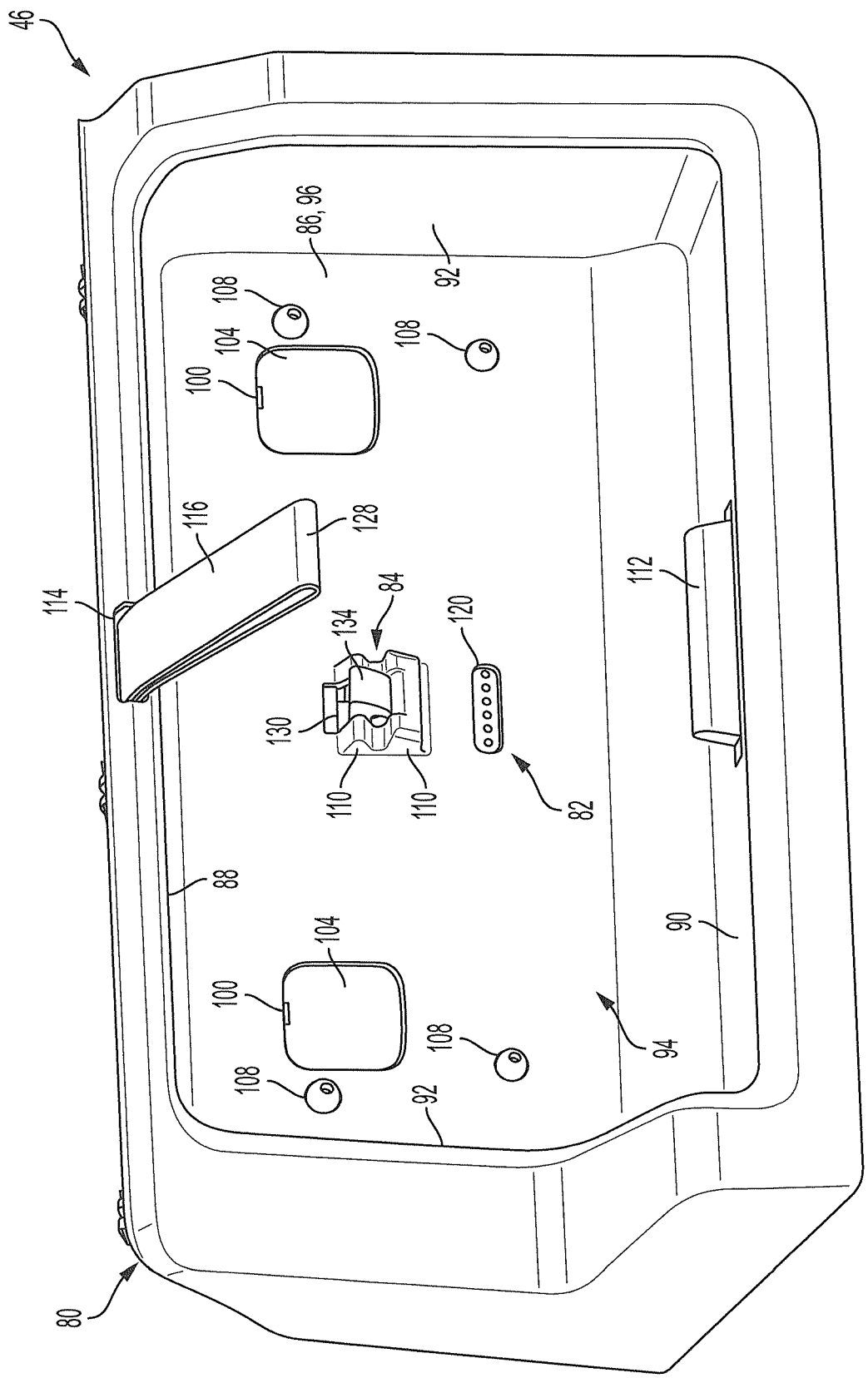
FIG. 6 is a front perspective view of an example docking station of the integrated wireless speaker system shown in FIG. 3, in accordance with the principles of the present disclosure.
Figure 7:
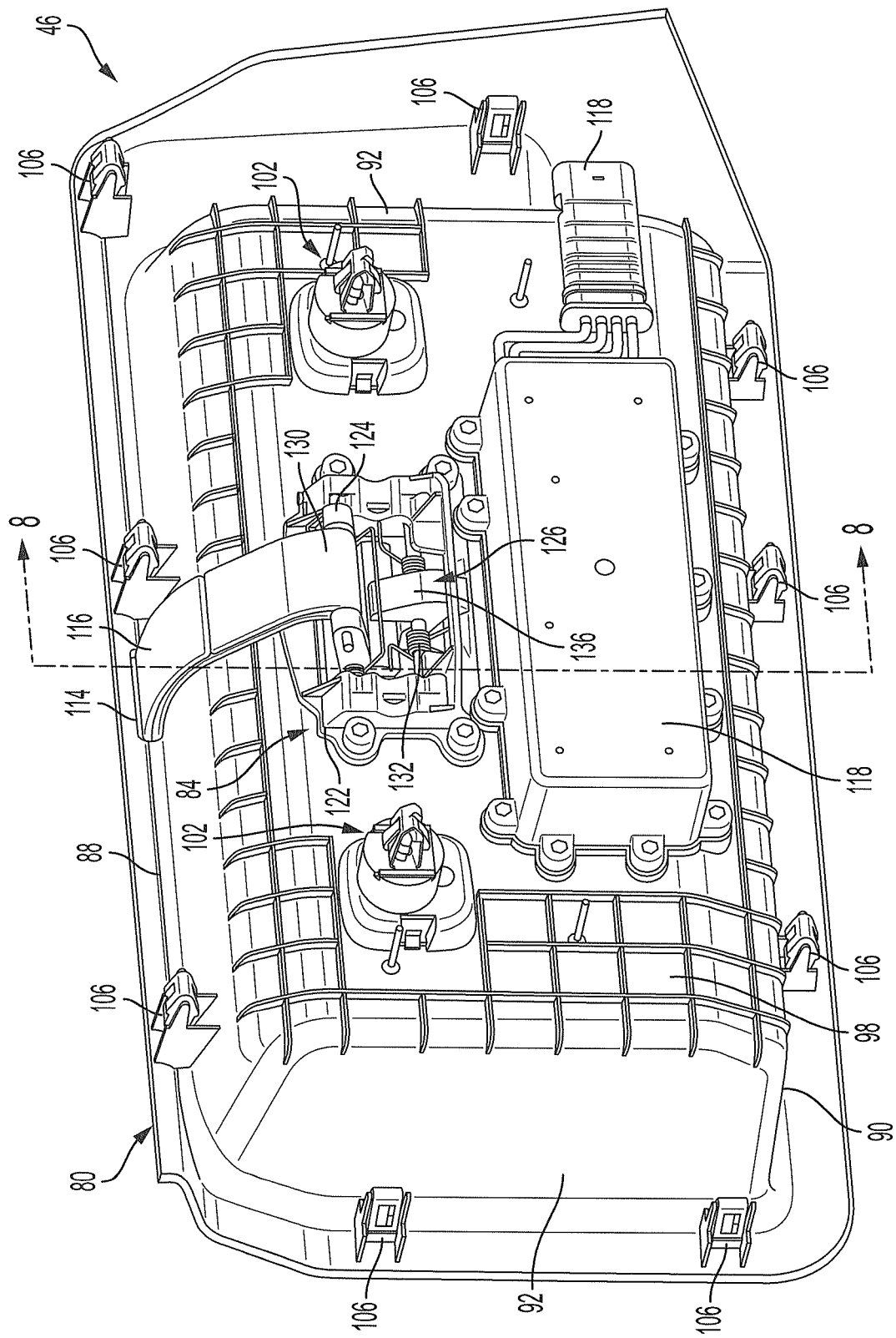
FIG. 7 is a rear perspective view of the docking station shown in FIG. 6, in accordance with the principles of the present disclosure.
Figure 8:
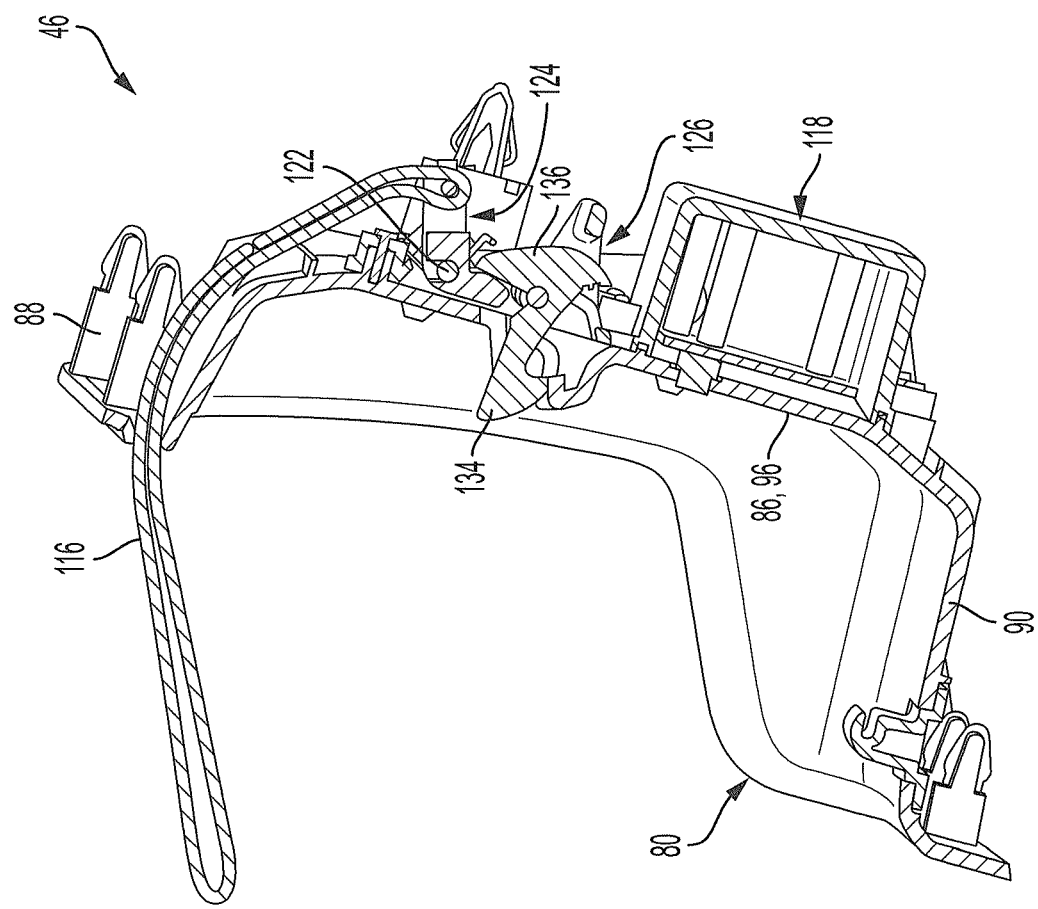
FIG. 8 is a cross-sectional view of the docking station shown in FIG. 7 and taken along line 8-8, in accordance with the principles of the present disclosure.

With further reference to FIGS. 6-8, the docking station 46 will described in more detail. In the illustrated embodiment, docking station 46 generally includes a body 80, an electrical connector 82, and a latching system 84 to securely attach the wireless speaker 44 to the vehicle 10 to prevent inadvertent detachment, for example, during a vehicle collision.

In the example embodiment, body 80 includes a back wall 86, an upper wall 88, a lower wall 90, and side walls 92 that generally define a receiving compartment 94 sized and shaped to removably receive the wireless speaker 44. The back wall 86 includes a front surface 96 (FIG. 6), a rear surface 98 (FIG. 7), and defines a pair of cavities 100 each having a fastener 102 such as, for example, a retention clip (e.g., see FIG. 7). The fasteners 102 are configured to couple to the bracket 32 of the vehicle rear wall 30 (FIG. 3). A plurality of covers 104 are each removably coupled to the back wall 86 to facilitate covering cavities 100 to thereby conceal the fasteners 102. In addition, as shown in FIG. 7, the rear of the body 80 includes a plurality of fasteners 106 generally disposed about the body perimeter and configured to further couple and secure the body 80 to the bracket 32 and/or cab rear wall 30.

As shown in FIG. 6, in the example embodiment, the back wall 86 also includes a plurality of bumpers 108 (e.g., rubber or elastomer) configured to support the docked wireless speaker 44 as it is drawn toward the back wall 86 by the latching system 84. A pair of converging projections 110 extend outwardly from back wall 86 and are configured to receive the speaker locking bar 66 therebetween to facilitate guiding the locking bar 66 into interaction with the latching system 84 for securely docking the speaker 44 within the docking station 46. Further, the back wall 86 includes an aperture 130 to enable one or more portions of the latching system 84 therethrough, as described herein in more detail.

In the example embodiment, the lower wall 90 includes a locating projection 112 configured to be received by the speaker bottom recess 60. During docking, the wireless speaker bottom 56 is inserted over the locating projection 112 and then rotated rearward toward the back wall 86 to secure the locking bar to the latching system 84. Thus, locating projection 112 and speaker bottom recess 60 facilitate locating and docking of the wireless speaker 44 within the docking station 46. Moreover, the upper wall 88 includes a slot 114 configured to receive a release strap 116 to facilitate releasing wireless speaker 44 from the latching system 84 and thus removing the speaker 44 from the docking station 46, as described herein in more detail.

In the illustrated example shown in FIGS. 6 and 7, the electrical connector 82 generally includes electronics 118 and a plurality of pin connectors 120. The electronics 118 are coupled to the rear surface 98 of the back wall 86 (see FIG. 7) and are electrically coupled to the pin connectors 120 (see FIG. 6). The pin connectors 120 are configured to connect to the wireless speaker electrical connector 62 and serve several functions. For example, one portion of the pin connectors 120 provide power and ground to charge the docked wireless speaker 44. Another portion of pin connectors 120 provide additional grounds so that when the speaker 44 is docked, the electronics 118 are looped/shorted out on purpose so the docking station 46 knows when the speaker 44 is docked, and similarly, the speaker 44 knows it is docked. Both the docking station 46 and the speaker 44 include logic (and associated controller with processor and memory, not shown) to recognize when the speaker 44 is undocked so as to prevent live voltage on the pin connectors 120 when the speaker 44 is undocked. The logic also prevents wireless connection to the speaker 44 when it is docked and enables the docked speaker 44 to function as a vehicle speaker 44 when docked.

With continued reference to FIGS. 6-8, the latching system 84 will be described in more detail. In the example embodiment, latching system 84 generally includes release strap 116, a support bracket 122, an engagement arm 124, and a latch 126. The release strap 116 includes a free first end 128 and a second end 130 coupled to the engagement arm 124. As shown in FIG. 7, the support bracket 122 is secured to the back wall rear surface 98. As illustrated, the engagement arm 124 and the latch 126 are rotatably coupled to the support bracket 122, and a biasing mechanism 132 (e.g., spring) is configured to rotatably bias latch 126 into a locked position. The latch 126 extends through the back wall 86 through aperture 130 and includes a first engagement end 134 disposed in front of back wall 86 (e.g., see FIG. 6), and a second engagement end 136 disposed behind back wall 86 (e.g., see FIG. 7).

In one example operation, wireless speaker 44 is docked within docking station 46 by inserting the wireless speaker bottom 56 over the locating projection 112 and subsequently rotating wireless speaker 44 rearward toward the back wall 30. The locking bar 66 is then received between converging projections 110 to secure to the latching system 84. More specifically, the locking bar 66 engages and rotates the latch first engagement end 134 upward. Once the locking bar 66 passes first engagement end 134, the biasing mechanism 132 rotates latch 126 back into the locked position to secure locking bar 66 between the projections 110 and the latch 126 to facilitate locking the speaker 44 to the docking station 46. To remove the speaker 44, the release strap free end 128 is pulled by a user, which causes the engagement arm 124 to rotate into contact with the latch second engagement end 136. This causes rotation of the latch 126 into the unlocked position, which releases locking bar 66 and enables removal of the wireless speaker 44.

When removed from the docking station 46, wireless speaker 44 detects such removal and disconnects from the vehicle audio system, thereby enabling peripheral devices, such as a user's smart phone, to wirelessly connect thereto. As such, audio media can be played on the wireless speaker 44 while the speaker is undocked from vehicle 10. In this way, vehicle 10 advantageously provides an on-demand, portable, wireless audio device that can be taken to any desirable location, such as to a beach or up a mountain. Moreover, the docking station 46 detects the absence of wireless speaker 44 and prevents live voltage on the pin connectors 120.

When docked in the docking station 46, wireless speaker 44 and the docking station 46 detect the docking and electrical connection via the electrical connectors 62, 82. Once connected, the wireless speaker 44 automatically connects to the vehicle audio system via electrical connectors 62, 82 and disables wireless connection to the speaker 44. Advantageously, the wireless speaker 44 is automatically connected to a source of power (e.g., a battery) in the vehicle 10 and is automatically recharged during predetermined conditions such as, for example, when the vehicle is turned on or driving.

Figure 2:
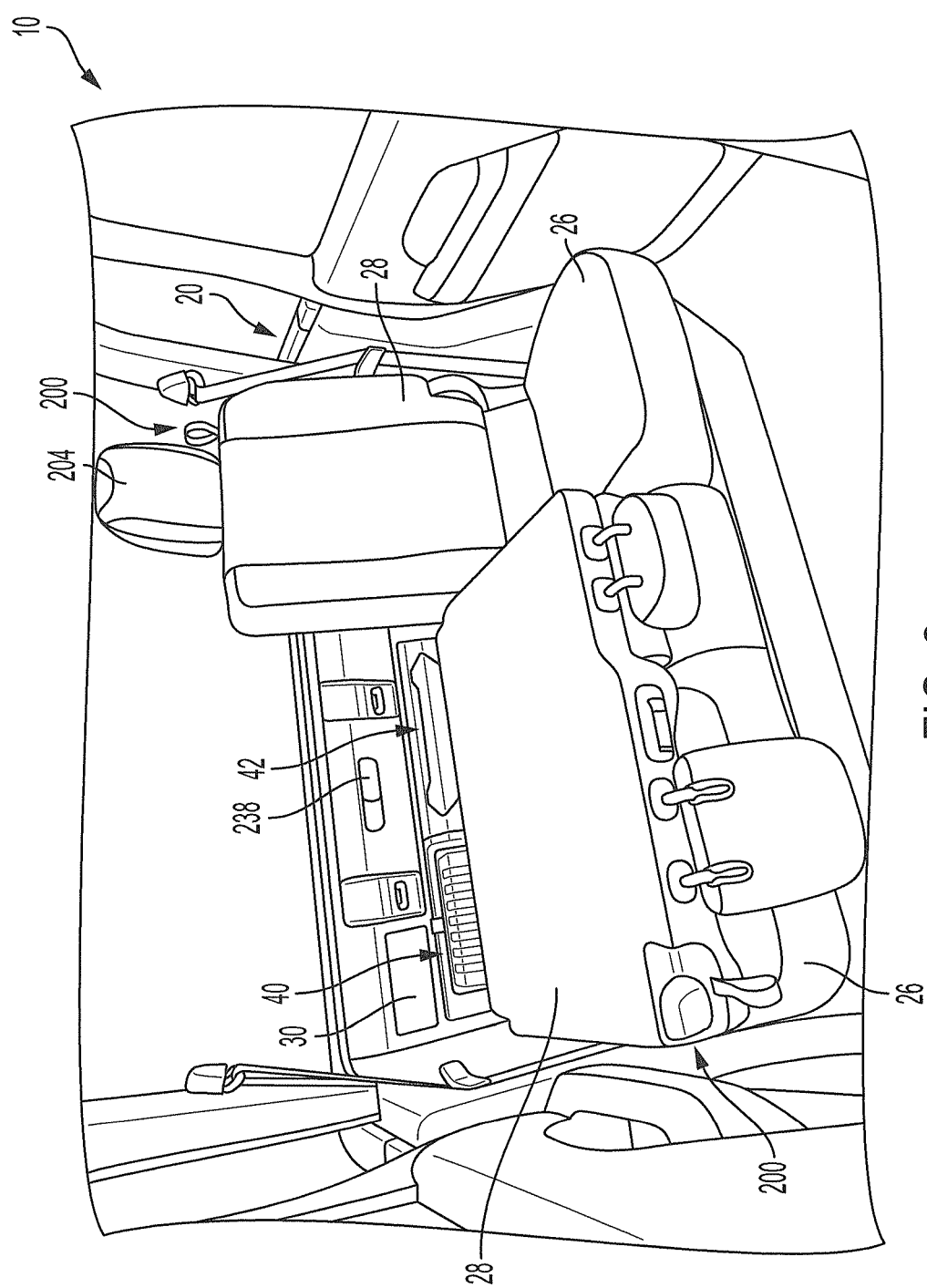
FIG. 2 is a perspective view of the rear seating of FIG. 1 shown in a folded seat position to reveal an example storage compartment having an example integrated wireless speaker system, in accordance with the principles of the present disclosure.

With reference now to FIGS. 9-15, the seat back locking system 200 will be described in more detail. As shown in FIGS. 1 and 2, seat back 28 is rotatable between the seating position (FIG. 1) and the folded seat position (FIG. 2). In the seating position, the seat back 28 is latched to the cab rear wall 30 and the seat 24 defines storage compartment 42 between the seat 24 and rear wall 30 for cargo or other objects. The seat back locking system 200 enables the latched seat back 28 to be selectively locked, thereby providing a secured storage compartment 42, for example, when a removable roof (e.g., soft top, hard top) is removed from the vehicle and the vehicle passenger compartment 16 is otherwise unsecured.

Figure 9:
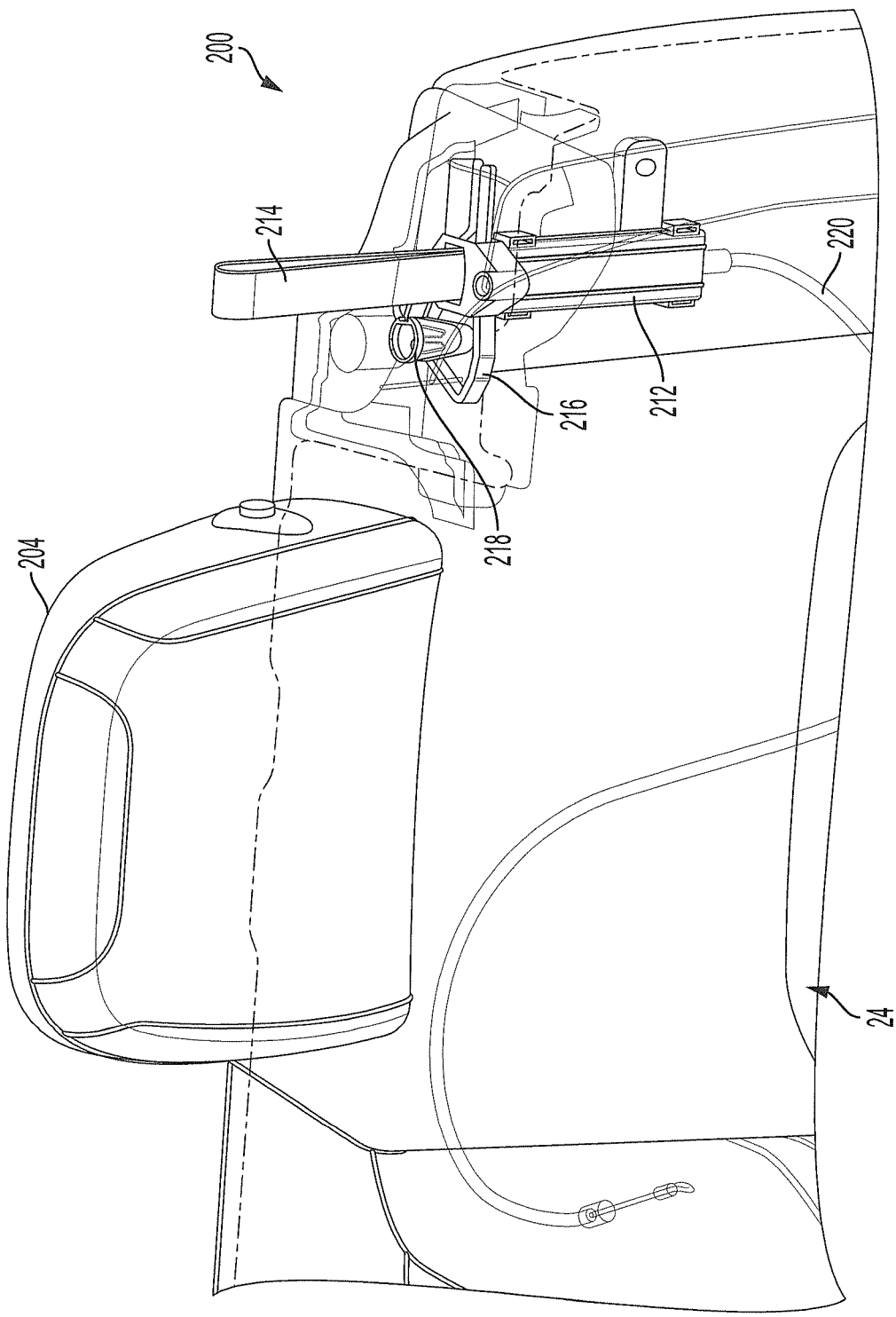
FIG. 9 is a perspective view of the seat back locking system of FIG. 1 positioned within an example vehicle seat shown in phantom, in accordance with the principles of the present disclosure.

As shown in FIGS. 2 and 9, in the example embodiment, the seat back locking system 200 is disposed in an upper quadrant of seat 24 adjacent a headrest 204 (e.g., near a passenger shoulder). However, it will be appreciated that seat back locking system 200 may be disposed in any other location in/on seat 24 that enables system 200 to function as described herein. For example, seat back locking system 200 may be disposed in seat bottom 26.

In the illustrated embodiment, shown in FIGS. 9-15, the seat back locking system 200 generally includes a main housing 210, a pull strap housing 212, a pull strap 214, a lock slider 216, a lock arm 218, and a cable system 220.

Figure 10:
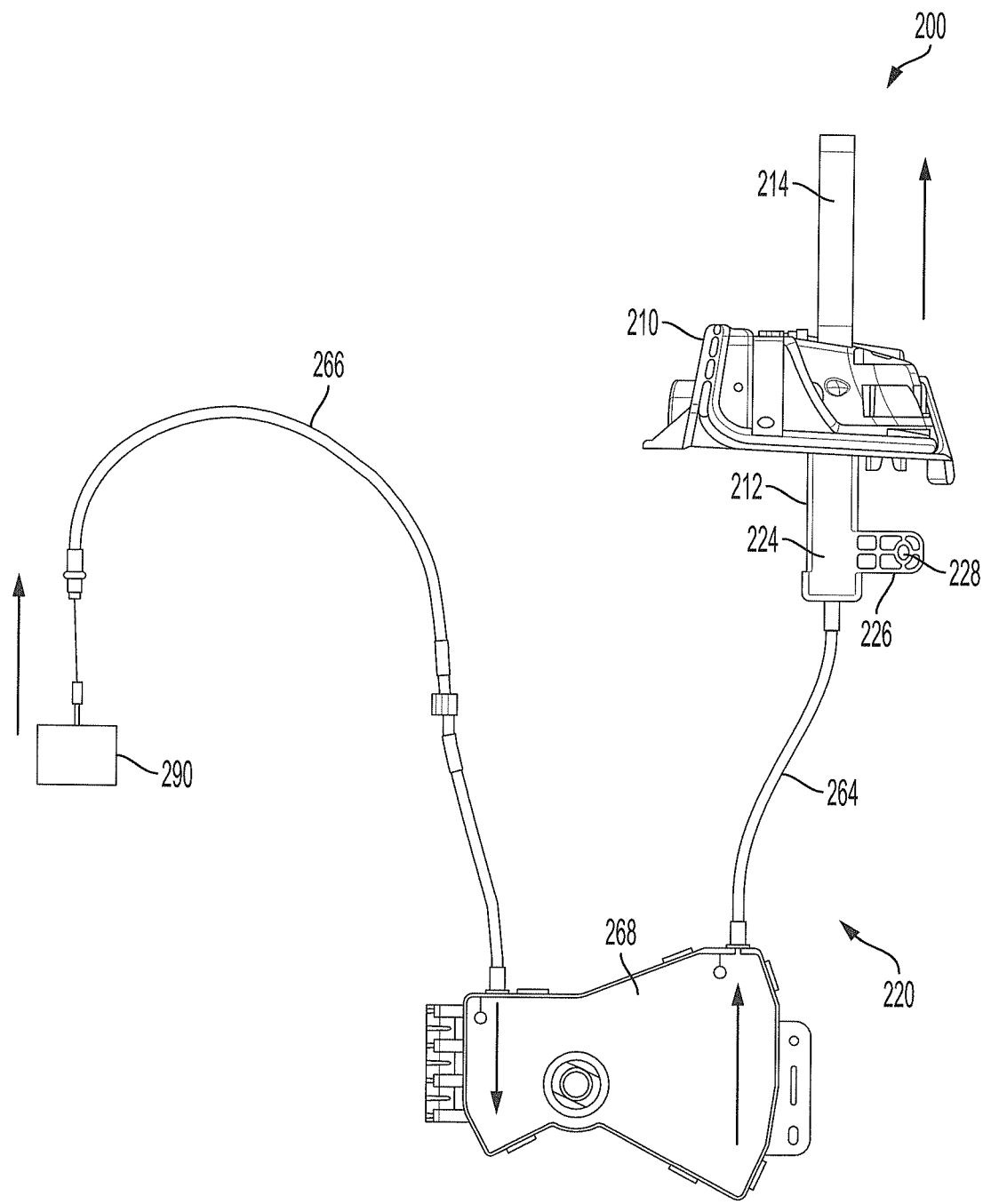
FIG. 10 is a side view of the seat back locking system of FIG. 9, in accordance with the principles of the present disclosure.

With continued reference to FIGS. 9 and 10, in the example embodiment, the main housing 210 is secured to the interior structure (not shown) of seat 24 and at least partially houses the pull strap housing 212, pull strap 214, lock slider 216, and lock arm 218. The pull strap housing 212 includes a body 224 to at least partially house the pull strap 214 and to provide a solid attachment for a portion of the cable system 220. A tab 226 extends from the body 224 and includes an aperture 228 to receive a fastener (not shown) to couple the pull strap housing 212 to the seat 24.

Figure 13:
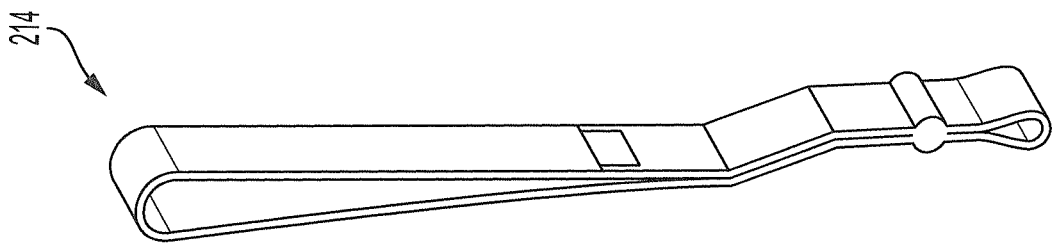
FIG. 13 illustrates a perspective view of an example pull strap of the seat back locking system shown in FIG. 9, in accordance with the principles of the present disclosure.

With additional reference to FIG. 13, the pull strap 214 includes a first end 230, an opposite second end 232, a locking barrel 234, and an indicator marking 236. The strap first end 230 is disposed within pull strap housing 212 and is configured to couple to the cable system 220. The strap second end 232 extends out of the housings 210, 212 and the seat 24 (see FIG. 9) and is located for a user to selectively pull the pull strap 214, which unlatches the seat back 28 from latch strikers 238 (FIG. 2) on the cab rear wall 30. The locking barrel 234 is operably associated with the lock slider 216 to selectively prevent movement of the pull strap 214 and thus an unlocking from the latch strikers 238, as described herein in more detail. The indicator marking 236 (e.g., a colored patch) is disposed on the pull strap 214 at a predetermined location to indicate when the pull strap 214 is in a position where the seat back 28 is unlatched from latch strikers 238. Thus, a user can quickly visually determine if the seat back 28 is securely latched to the rear wall 30.

Figure 12:
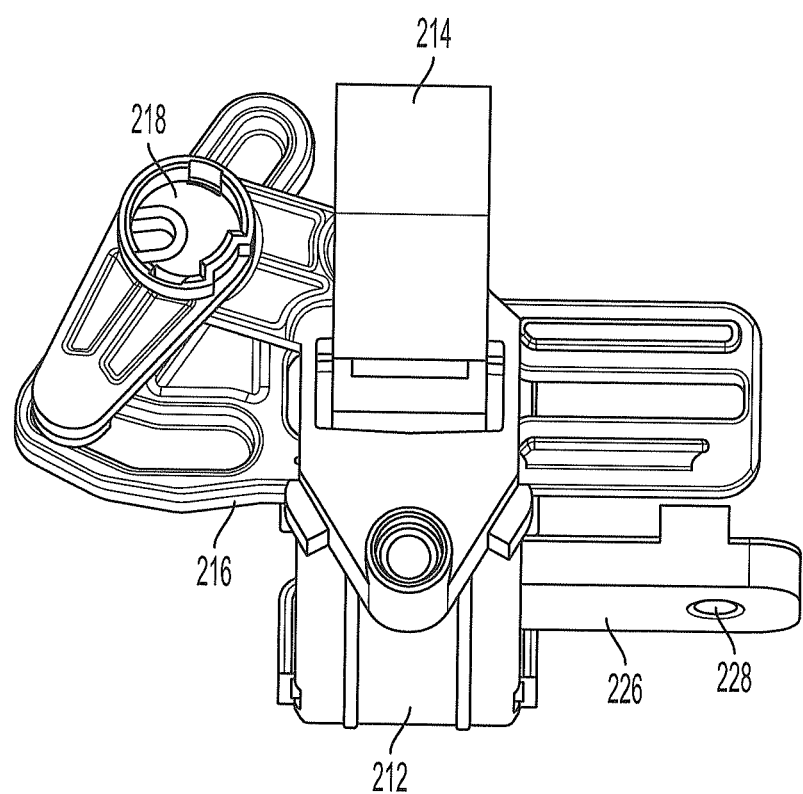
FIG. 12 illustrates one example embodiment of a portion of the seat back locking system shown in FIG. 9, in accordance with the principles of the present disclosure.
Figure 14:
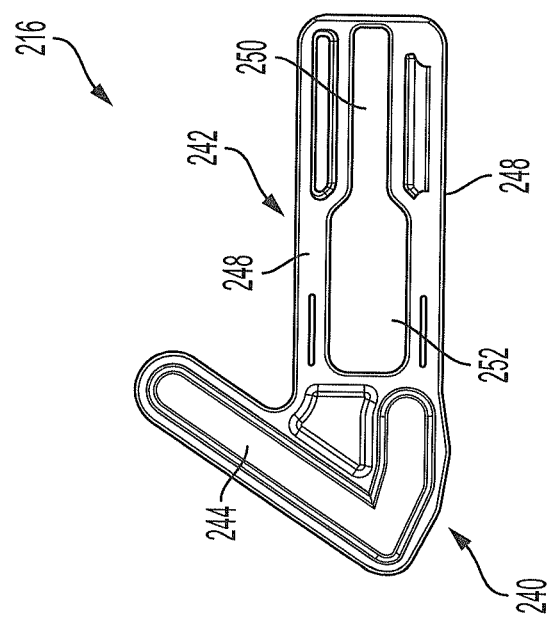
FIG. 14 illustrates a top view of an example lock slider of the seat back locking system shown in FIG. 12, in accordance with the principles of the present disclosure.

As shown in FIGS. 12 and 14, in the example embodiment, the lock slider 216 and lock arm 218 are configured to selectively lock pull strap 214 within pull strap housing 212 to prevent pulling of the pull strap 214. In the example embodiment, lock slider 216 generally includes a lock arm guide portion 240 and a strap guide portion 242. The lock arm guide portion 240 includes a channel 244 configured to receive and guide a pin 246 of the lock arm 218 therealong. The strap guide portion 242 includes a pair of arms 248 extending from lock arm guide portion 240. The arms 248 define a narrow gap 250 and a wider gap 252. When the pull strap 214 is disposed in the narrow gap 250, the arms 248 prevent the locking barrel 234 from passing therethrough, and thus prevent a pulling of the pull strap 214 to unlatch the seat back 28 from the rear wall 30. When the pull strap 214 is disposed in the wider gap 252, the arms 248 allow the locking barrel 234 to pass therethrough, enabling pulling of the pull strap 214 to unlatch the seat back 28 from the rear wall 30.

Figure 15:
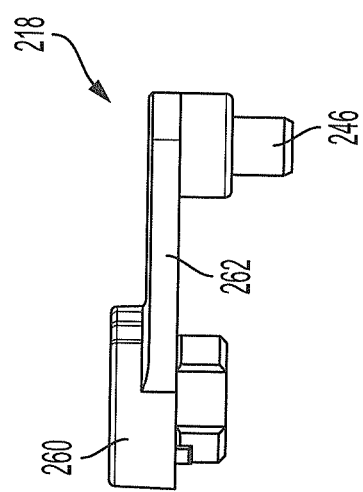
FIG. 15 illustrates a side view of an example lock arm of the seat back locking system shown in FIG. 12, in accordance with the principles of the present disclosure.

With additional reference to FIG. 15, in the example embodiment, the lock arm 218 generally includes a central body 260 and an arm 262 extending therefrom. The arm 262 includes at its distal end the pin 246, which is slidingly received in the lock slider channel 244. The central body 260 is configured to interface with a lock and tumbler (not shown), which may be advantageously keyed to the vehicle keys such that seat back locking systems 200 do not require a separate key. Rotation of the lock and tumbler causes rotation of the central body 260, which causes lock arm pin 246 to slide along lock slider channel 244. This movement causes the lock slider 216 to translate in a general cross-car direction relative to the pull strap housing 212 between a locked position (where pull strap 214 is positioned in the narrow gap 250) and an unlocked position (where pull strap 214 is positioned in the wider gap 252).

With further reference to FIG. 10, in the example embodiment, cable system 220 generally includes first and second Bowden cables 264, 266 and a ratio box 268. The first Bowden cable 264 is coupled between the pull strap 214 and the ratio box 268, and the second Bowden cable 266 is coupled between the ratio box 268 output and a seat latch 290 for selectively latching to latch striker 238.

Figure 11:
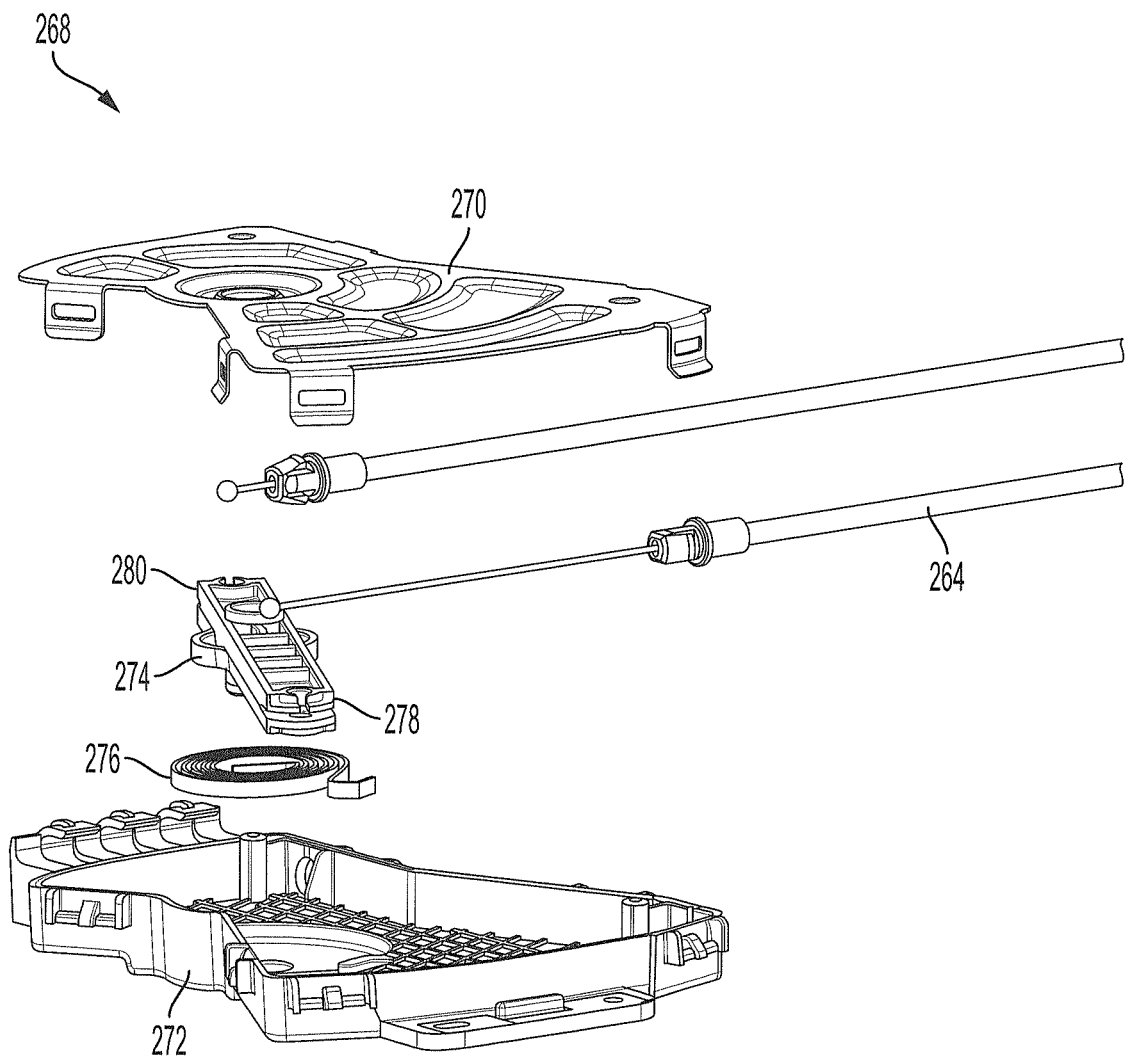
FIG. 11 is an exploded view of an example ratio box of the seat back locking system shown in FIG. 10, in accordance with the principles of the present disclosure.

With further reference to FIG. 11, the ratio box 268 provides a ratio between the amount of effort and resulting force. In one example, ratio box 268 is a 2:1 ratio. As such, pulling the pull strap 214 a first distance results in pulling the seat latch half the first distance but with twice the force. In the illustrated example, the ratio box 268 includes an upper housing 270, a lower housing 272, a transfer lever 274, and a return biasing mechanism 276 (e.g., a clock spring). The upper and lower housings 270, 272 are configured to couple to each other to house the transfer lever 274 and biasing mechanism 276, we well as to define one or more apertures to receive Bowden cables 264, 266. The transfer lever 274 is rotatably coupled to housing 270 and/or 272 and includes a first end 278 and an opposite second end 280. The first end 278 is configured to couple to one end of the first Bowden cable 264, and the second end 280 is configured to couple to one end of the second Bowden cable 266. The return biasing mechanism 276 is configured to pull the pull strap 214 back into the seat 24 when the seat is relatched to strikers 238. It will be appreciated, however, that system 200 may not include a ratio box, or ratio box 268 may have various other configurations that enable cable system 220 to function as described herein.

In one example operation, the seat back locking system 200 begins in the locked position with the seat back 28 latched to the rear wall 30. In this position, the lock arm 218 interacts with the lock slider 216 to locate the lock slider in the locked position with the pull strap 214 disposed within the narrow gap 250. As such, the locking barrel 234 is disposed below the arms 248 and pulling of the pull strap 214 causes the locking barrel 234 to engage the lock slider 216, thereby preventing pulling of the pull strap 214 and subsequent unlatching of the seat back 28 from the rear wall 30. In this way, items stored in the storage compartment 42 between the seat 24 and rear wall 30, such as integrated wireless speaker system 40, are secured and inaccessible without a key.

When the key is used to unlock the seat back locking system 200, the lock and tumbler are rotated, thereby causing rotation of the lock arm 218. This causes lock arm pin 246 to translate along channel 244, which translates the lock slider 216 into the unlocked position where the pull strap 214 is disposed within the wider gap 252. As such, when pull strap 214 is pulled, locking barrel 234 passes through the wider gap 252, which pulls the first Bowden cable 264. This motion is transferred through ratio box 268 to the second Bowden cable 266 to release the seat latch 290 from the latch striker 238. In this way, the storage compartment 42 can now be accessed, for example, to dock or undock the wireless speaker 44 from the docking station 46.

Described herein are systems and methods for a vehicle with an integrated wireless speaker system that includes a docking station disposed in the vehicle interior and a wireless speaker configured to removably dock therein. The integrated wireless speaker system can be disposed behind vehicle rear seats in a cargo compartment that is optionally secured by a seat back locking system. When docked, the wireless speaker system connects to the vehicle audio system and automatically charges when the vehicle is running. When undocked, the wireless speaker is portable and configured to connect to peripheral devices.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle with an integrated portable audio system, the vehicle comprising:
   an interior body defining an interior passenger compartment and a docking station that defines a receiving compartment;
   a wireless speaker removably dockable with the docking station via the receiving compartment, which is sized and shaped to removably receive and retain the wireless speaker;
   a floor;
   a seat including a seat bottom rotatably coupled to a seat back, the seat back selectively latchable to a rear wall and movable between a seating position where the seat back is latched to the rear wall, and a folded seat position where the seat back is rotated downward onto the seat bottom; and
   a storage compartment defined behind the seat back between the floor, the rear wall, and the seat back,
   wherein the wireless speaker and docking station are disposed within storage compartment,
   wherein when docked with the docking station, the wireless speaker is i) configured to automatically connect to an audio system of the vehicle, and ii) connected to a power source of the vehicle to automatically charge the wireless speaker, and
   wherein when removed from the docking station, the wireless speaker is portable and configured to connect to a peripheral device for playing audio media on the wireless speaker.

2. The vehicle of claim 1, wherein the interior body includes a rear wall, and wherein the receiving compartment of the docking station is integrated into the rear wall.

3. The vehicle of claim 1, further comprising a seat back locking system integrated into the seat and movable from a locked position that prevents unlatching the seat back from the rear wall, and an unlocked position that enables unlatching of the seat back from the rear wall,
   wherein in the locked position, the seat back locking system prevents unlatching of the seat back from the rear wall to thereby prevent access to the integrated wireless speaker system.

4. The vehicle of claim 1, wherein the docking station includes a dock body, an electrical connector, and a latching system configured to selectively latch to the wireless speaker.

5. The vehicle of claim 4, wherein the dock body includes a plurality of fasteners configured to couple and secure the dock body to the rear wall.

6. The vehicle of claim 5, wherein the dock body includes a back wall, an upper wall, a lower wall, and side walls that define the receiving compartment.
   wherein the lower wall includes a locating projection configured to be received by a recess formed in a bottom wall of the wireless speaker to facilitate locating and docking the wireless speaker within the docking station.

7. A vehicle with an integrated portable audio system, the vehicle comprising:
   an interior body defining an interior passenger compartment and a docking station that defines a receiving compartment; and
   a wireless speaker removably dockable with the docking station via the receiving compartment, which is sized and shaped to removably receive and retain the wireless speaker,
   wherein when docked with the docking station, the wireless speaker is i) configured to automatically connect to an audio system of the vehicle, and ii) connected to a power source of the vehicle to automatically charge the wireless speaker, and
   wherein when removed from the docking station, the wireless speaker is portable and configured to connect to a peripheral device for playing audio media on the wireless speaker,
   wherein the docking station includes a dock body having a plurality of fasteners configured to couple and secure the dock body to a rear wall of the interior body,
   wherein the dock body includes a back wall, an upper wall, a lower wall, and side walls that define the receiving compartment,
   wherein the lower wall includes a locating projection configured to be received by a recess formed in a bottom wall of the wireless speaker to facilitate locating and docking the wireless speaker within the docking station, and
   wherein the back wall includes a plurality of cavities each having a retention clip disposed therein configured to couple to the vehicle rear wall, and a plurality of covers removably coupled to the back wall to cover the plurality of cavities and conceal the retention clips.

8. The vehicle of claim 4, wherein the electrical connector includes electronics and a plurality of pin connectors configured to connect to a second electrical connector of the wireless speaker.

9. The vehicle of claim 8, wherein a first portion of the pin connectors provide power and ground to charge the wireless speaker, a second portion of the pin connectors provide additional grounds.

* * * * *